Aug. 20, 1940.   F. J. WOOD   2,212,092
SEPARATING AND CLEANING MECHANISM FOR THRESHING MACHINES
Filed Sept. 13, 1937
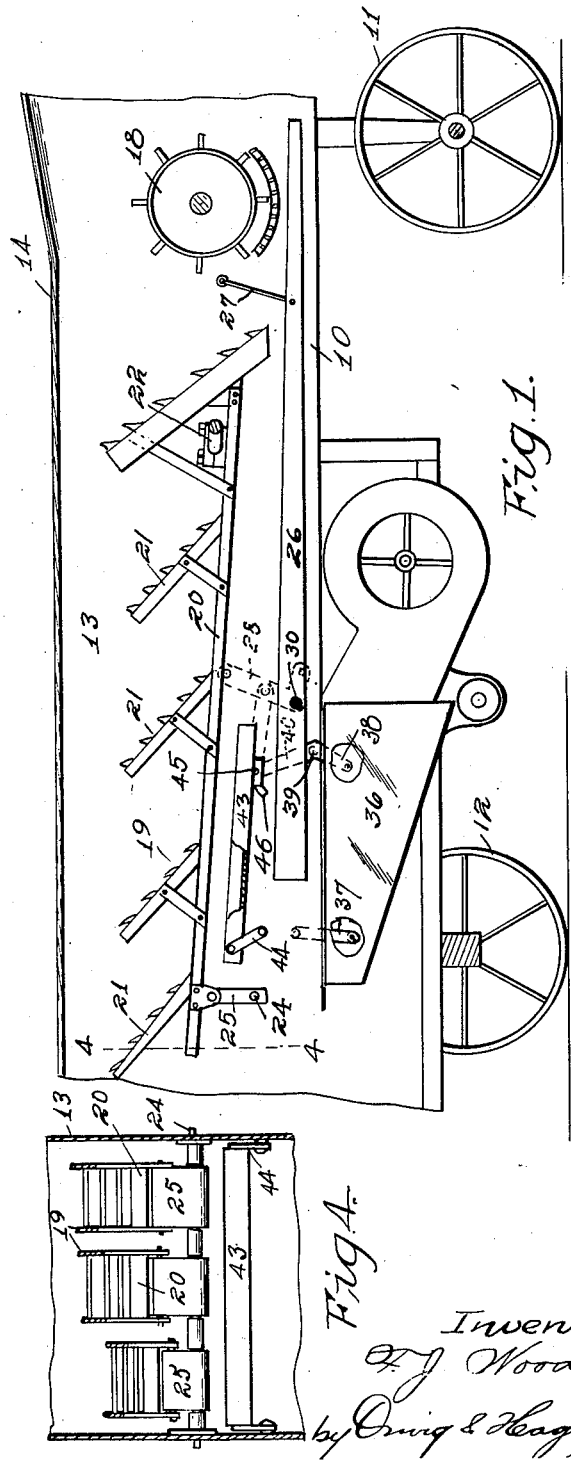
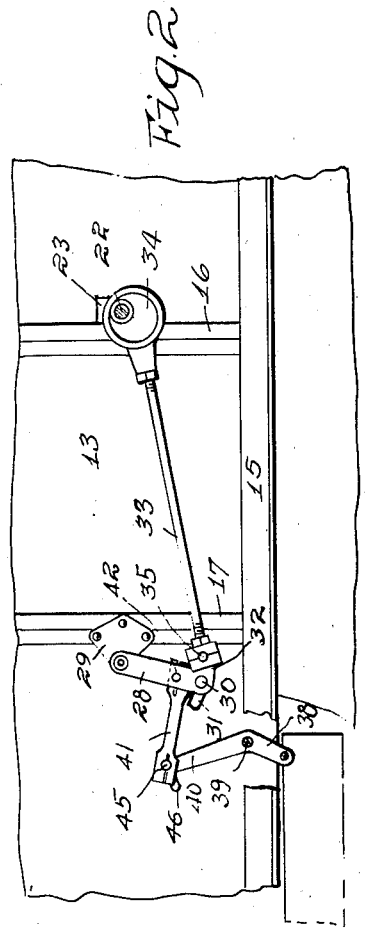
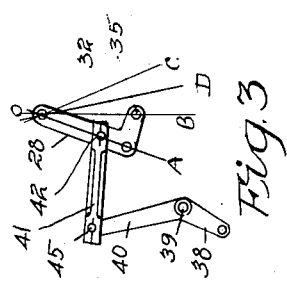
Inventor
F. J. Wood, Patented Aug. 20, 1940

2,212,092

UNITED STATES PATENT OFFICE 2,212,092

SEPARATING AND CLEANING MECHANISM FOR THRESHING MACHINES

Franz J. Wood, Des Moines, Iowa

Application September 13, 1937, Serial No. 163,582

2 Claims. (Cl. 130—24)

This invention relates to improvements in machines for threshing various types of grains, grass seeds, etc., and more particularly for operating the separating and cleaning devices which constitute reciprocating straw racks, grain pan, return pan and a cleaning shoe. These devices are supported within the threshing machine body and adapted to receive the grain from the threshing cylinder, and are mounted to reciprocate longitudinally of the threshing machine. On account of the parts being of considerable weight it will readily be seen that there exists a tendency toward oscillating the entire machine in counter directions to the directions of movements of the above-mentioned parts. This objection has been largely overcome by operating some of the parts to reciprocate in a reverse direction of the other parts. The principle, however, of reciprocating some of the members in opposite directions from the others for balancing purposes is not new. However, the mechanism employed heretofore for mounting the devices and reciprocating the same, and the mechanism for producing the reciprocation have been more or less complicated, requiring a large number of moving parts to be lubricated and attention on the part of the operator to see that the parts are in working condition. Furthermore, a considerable amount of power is required to operate these devices. It is, therefore, the object of my invention to provide in a threshing machine employing reciprocating straw racks, grain pans, return pans and cleaning mechanism, improved devices for mounting the said reciprocating elements and for imparting thereto reciprocating movements in such a manner that some of the reciprocating elements will counter-balance others and at the same time eliminate a considerable amount of power in the operation of said devices.

A further object of my invention is to provide in a threshing machine employing a number of reciprocating straw racks for receiving straw and threshed grain from the cylinder, improved means for mounting and operating straw racks wherein a better and more efficient movement is imparted thereto, so as to accomplish a more thorough and complete separation of the grain from the straw in a comparatively short threshing machine.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a vertical longitudinal sectional view of a threshing machine showing the manner in which the straw racks, drain pan, cleaner shoe and return pan are located therein with respect to the cylinder and other co-operating parts.

Figure 2 is a side elevation of a segmental portion of a threshing machine showing the manner in which my improved mechanism for operating the said reciprocating parts is mounted on said threshing machine, and the manner in which the said mechanism is connected to said reciprocating elements.

Figure 3 is a diagrammatical view of a portion of the mechanism for imparting the proper movement to said parts.

Figure 4 is a detail sectional view taken on the line 4—4 of Figure 1.

Referring to the drawing, I have used the reference numeral 10 to indicate a threshing machine body having supporting wheels 11 at the front end and supporting wheels 12 at the rear end of said body, the said body including side members 13 and a top 14. The body of the threshing machine also includes horizontally arranged frame members 15 and upright frame members 16 and 17. Supported in the front end of the body 10 is a threshing cylinder 18, of ordinary construction. Supported longitudinally within the body and back of the cylinder 18 is a series of straw racks 19. Each of said racks comprises a longitudinally extending beam 20 having upwardly and rearwardly extending racks 21, which are of ordinary construction. The forward end of each of the racks 21 is provided with a boxing supported on a crank shaft 22, said crank shaft being supported in suitable bearings 23 carried by the frame members 16, the shaft 22 being operated by a belt pulley or any other suitable means, and not illustrated, so that the shaft 22 is rotated in a counter clock-wise direction, as illustrated in Figure 1. The rear ends of the members 20 are supported by means of a shaft 24 extending transversely across the back end of the threshing machine, said shaft being provided with pivotally mounted blocks 25 each having its upper end pivotally mounted to the rear end of a corresponding member 20 in such a manner that as the shaft 22 is rotated the blocks 25 will be oscillated from a vertical position to a forwardly and upwardly inclined position, so that the rear ends of the racks 19 will move upwardly and rearwardly, while the forward ends of the bars 20 will move substantially in a circular path, thus providing an improved means for mounting the rear end of the straw racks. By this arrangement the speed of the rear ends of the straw racks will be accelerated at the beginning of their rearward movement so as to toss or throw the material upwardly and rearwardly as it is delivered from the straw racks. The oscillating blocks 25 also provide a simple and inexpensive means for mounting the rear ends of the bars 20 wherein a crank shaft, a duplicate of the shaft 22, is entirely eliminated, and at the same time provide means whereby the separation of the straw and grain is completely accomplished.

Supported in the bottom side of the body 10 is a grain pan 26, of ordinary construction, having its forward end supported by arms 27 pivotally mounted to the side members 13, said arms being adapted to swing from a substantially vertical position to a rearwardly and downwardly inclined position as the grain pan is reciprocated. The rear end of the grain pan is supported by means of a pair of L-shaped links 28 having their upper ends pivotally mounted to brackets 29 carried by the upright frame members 17. The lower end of each of the links 28 is provided with a pivot pin 30 adapted to extend inwardly to the interior of the body through a slot 31, the inner end of the pin 30 being mounted in the grain pan 26, thus providing means whereby the grain pan will be reciprocated as the links 28 are swung through the angle AOB as illustrated in Figure 3, from a rearwardly inclined position AO to the vertical position OB. The lower end of each of the links 28 is provided with a forwardly extending L portion 32 to which an eccentric-rod 33 is attached, the forward end of each of the rods being connected to an eccentric 34 carried by the shaft 22, thus providing means whereby as the shaft 22 is rotated, the rods 33 will be reciprocated and the links 28 swung through the angle AOB before described, the rod 33 being connected to the member 32 by means of a pivot 35, the pivot 35 travelling through the angle BOC, the line OD bisecting the angle BOC and being perpendicular to the eccentric-rod 23 when the said eccentric-rod is at its dead-center position. The extension or L portion 32 thus provides means whereby the pivot point 35 may be carried through an arc having its bisecting line perpendicular to the eccentric rod 33 so as to impart a uniform movement of the pivot 35 through its forward and rearward strokes and at the same time move the pin 30 upwardly and rearwardly, or vice-versa.

The threshing machine is also provided with a cleaning shoe 36 of usual construction having its rear end supported by swinging links 37, the upper ends of said links being pivotally connected to the side members 13, the lower ends of said links being pivotally connected to the rear end of the shoe. The forward end of the cleaning shoe 36 is supported by links 38 pivotally connected to the side members 13 by pivots 39, said links being normally inclined rearwardly and downwardly and adapted to have their lower ends swing upwardly and rearwardly so that the cleaning shoe will be reciprocated in an upwardly and rearwardly inclined plane.

Each of the links 38 is provided with an upwardly extended portion 40, having their upper ends pivotally connected to links 41, said links 41 being in turn pivotally connected to the links 28 at points 42 intermediate their ends. Means is thus provided for reciprocating the shoe 36 in the opposite direction from the grain pan 26.

Supported beneath the delivery end of the racks 19 is a return pan 43 which is also of ordinary construction, having its lower end supported by means of upwardly and rearwardly inclined links 44 which are also pivotally connected to the side members 13. The forward end of the grain pan 43 is carried by pivot pins 45 carried by the upper end of the links 40, said pins extending through slots 46 in the side members 13. Thus means is provided for oscillating the return pan.

The operation of my device is as follows: Assuming that the shaft 22 is being rotated in a counter-clockwise direction, then motion will be imparted to the forward ends of the bars 20, causing the forward ends of said bars to travel through substantially circular paths while the rear ends of the bars 20 travel through arcuate paths, causing the ends of the members 21 to move upwardly and forwardly through the first half of the revolution of the crank 22, thence rearwardly and slightly downwardly as the crank 22 travels through the second half of its revolution, the upper ends of the members 25 first moving downwardly and forwardly during the first half of said revolution, and thence upwardly and rearwardly on the second half. This causes a great deal of agitation of the material as it is delivered over the ends of the members 21. The rotation of the crank 22 also causes the eccentric rod 33 to be reciprocated forwardly on the first half of said revolution, causing the lower ends of the links 28 to move forwardly, and with them the grain pan 26, the links 41 causing the upper ends of the members 40 to move forwardly, and with them the return pan 43, at which time the shoe 36 will be moved rearwardly by means of the levers 38. It might be stated that the boxings of the members 20 and the cranks of the shaft 22 are set at 120° apart so that the longitudinal movement of the bars 20 substantially counter-balance each other, while the weight of the shoe 36 moving in one direction substantially counter-balances the weight of the grain pan 26 and the return pan 43, thus providing a mechanism whereby longitudinal reciprocation of the threshing machine frame is largely eliminated, due to momentum of the moving parts therein.

By the above arrangement it will be seen that I have provided improved means for mounting the rear ends of the straw racks wherein all of the straw racks are operated from a continuously driven crank shaft, and in connection therewith a very simple and comparatively cheap link and lever arrangement for supporting and reciprocating simultaneously the grain pan, cleaning shoe and the return pan, wherein the cleaning shoe is reciprocated in the opposite direction from the grain pan and the return pan, and wherein the momentum of the grain pan moving in one direction is counter-balanced by the momentum of the cleaning shoe moving in the opposite direction, thus providing means whereby the said parts may be operated without imparting excessive oscillations to the thresher and wherein at the same time the power required to operate the same is greatly reduced. On account of the parts being operated in a balanced condition undue wear is relieved from the bearings and working parts. The link devices for supporting the grain pans are so arranged as to impart the most efficient movement to advance the grain rearwardly of the thresher even if the threshing machine is not absolutely level as has heretofore been required in threshing machines of the larger type.

I claim as my invention:

1. The combination of a threshing machine having a frame, a grain pan, a return pan, a cleaning shoe, means for imparting reciprocating movement thereto, comprising a pair of pivotally supported and depending links secured to said frame, means pivotally connecting the free ends of said links to opposite sides of the grain pan near its rear end, means operatively supporting the forward end of said grain pan, a pair of upright bell crank levers pivoted to said frame, means pivotally connecting the lower ends of said bell crank levers to the shoe, means pivotally connecting the upper end of said bell crank levers to said return pan, links operatively connecting the upper ends of the bell crank levers to the first links, and means for simultaneously oscillating the first links.

2. The combination of a threshing machine having a frame, a crank shaft, a grain pan, a return pan, a cleaning shoe, means for imparting reciprocating movement thereto, comprising a pair of pivotally supported and depending links secured to said frame, means pivotally connecting the free ends of said links to opposite sides of the grain pan near its rear end, means operatively supporting the forward end of said grain pan, a pair of upright bell crank levers pivoted to said frame, means pivotally connecting the lower ends of said bell crank levers to the shoe, means pivotally connecting the upper end of said bell crank levers to said return pan, links operatively connecting the upper ends of the bell crank levers to the first links, and means operatively connecting the upper ends of said links to said crank shaft.

FRANZ J. WOOD.